US009709162B2

United States Patent
Saji et al.

(10) Patent No.: US 9,709,162 B2
(45) Date of Patent: Jul. 18, 2017

(54) HYDRAULIC CONTROL DEVICE OF AUTOMATIC TRANSMISSION

(71) Applicant: Mazda Motor Corporation, Aki-gun, Hiroshima (JP)

(72) Inventors: Koshiro Saji, Hiroshima (JP); Shinya Kamada, Kure (JP); Shotaro Nagai, Hiroshima (JP)

(73) Assignee: MAZDA MOTOR CORPORATION, Aki-gun, Hiroshima (JP)

( * ) Notice: Subject to any disclaimer, the term of this patent is extended or adjusted under 35 U.S.C. 154(b) by 79 days.

(21) Appl. No.: 14/893,493

(22) PCT Filed: May 26, 2014

(86) PCT No.: PCT/JP2014/002755
§ 371 (c)(1),
(2) Date: Nov. 23, 2015

(87) PCT Pub. No.: WO2014/192277
PCT Pub. Date: Dec. 4, 2014

(65) Prior Publication Data
US 2016/0091085 A1 Mar. 31, 2016

(30) Foreign Application Priority Data
May 28, 2013 (JP) .................................. 2013-112023

(51) Int. Cl.
*F16H 61/02* (2006.01)
*F16H 61/04* (2006.01)
(Continued)

(52) U.S. Cl.
CPC ........... *F16H 61/0206* (2013.01); *F16H 3/66* (2013.01); *F16H 61/686* (2013.01);
(Continued)

(58) Field of Classification Search
CPC ......... Y10T 477/6934; Y10T 477/6935; Y10T 477/693636; Y10T 477/693637;
(Continued)

(56) References Cited

U.S. PATENT DOCUMENTS 6,258,010 B1 * 7/2001 Bai ...................... F16H 61/0206
477/131
6,464,609 B1 * 10/2002 Bai ...................... F16H 61/0206
475/116
(Continued)

FOREIGN PATENT DOCUMENTS

CN 102734456 A 10/2012
JP H07019326 A 1/1995
(Continued)

OTHER PUBLICATIONS

ISA Japanese Patent Office, Translation of Written Opinion Issued in Application No. PCT/JP2014/002755, Aug. 12, 2014, WIPO, 4 pages.
(Continued)

*Primary Examiner* — Roger Pang
(74) *Attorney, Agent, or Firm* — Alleman Hall Creasman & Tuttle LLP (57) ABSTRACT

A hydraulic control device of an automatic transmission configured such that: a first gear stage is formed by engagement of an LR brake and a low clutch; a third gear stage by engagement of the low clutch and an R35 brake; and a reverse gear stage by engagement of the LR brake and the R35 brake. The hydraulic control device includes a cut valve configured to be switched between a first state where a source pressure port of a third linear solenoid valve (SV) configured to control an oil pressure supplied to the R35 brake is connected to an oil pressure source and a second state where the pressure is discharged from the port. The cut valve becomes the second state when the third gear stage is
(Continued)

shifted to the first gear stage, and the oil pressure supplied to the low clutch is less than a predetermined oil pressure.

12 Claims, 8 Drawing Sheets

(51) Int. Cl.
 *F16H 61/686* (2006.01)
 *F16H 3/66* (2006.01)
(52) U.S. Cl.
 CPC ........... *F16H 2061/0209* (2013.01); *F16H 2061/0451* (2013.01); *F16H 2061/0455* (2013.01); *F16H 2061/0466* (2013.01); *F16H 2200/0052* (2013.01); *F16H 2200/201* (2013.01); *F16H 2200/2043* (2013.01); *Y10T 477/6935* (2015.01); *Y10T 477/693636* (2015.01); *Y10T 477/693637* (2015.01); *Y10T 477/693643* (2015.01)
(58) Field of Classification Search
 CPC ... Y10T 477/693643; F16H 2061/0209; F16H 2061/0451; F16H 2061/0466; F16H 2061/0455
 USPC ........................................................ 475/128
 See application file for complete search history.

(56) References Cited

U.S. PATENT DOCUMENTS

| 2007/0026998 A1* | 2/2007 | Nozaki | F16H 61/12 |
| | | | 477/118 |
| 2015/0369359 A1* | 12/2015 | Tsutsui | F16H 59/14 |
| | | | 477/115 |

FOREIGN PATENT DOCUMENTS

| JP | 2009014142 A | 1/2009 |
| JP | 2010209934 A | 9/2010 |

OTHER PUBLICATIONS

State Intellectual Property Office of the People's Republic of China, Office Action and Search Report Issued in Application No. 201480002481.8, Dec. 1, 2015, 8 pages. (Submitted with Translation of Search Report).

ISA Japanese Patent Office, International Search Report Issued in Application No. PCT/JP2014/002755, Sep. 2, 2014, WIPO, 2 pages.

* cited by examiner

Fig. 1

| | LOW CLUTCH (40) | HIGH CLUTCH (50) | LR BRAKE (60) | 26 BRAKE (70) | R35 BRAKE (80) |
|---|---|---|---|---|---|
| FIRST GEAR STAGE | ENGAGED | | ENGAGED | | |
| SECOND GEAR STAGE | ENGAGED | | | ENGAGED | |
| THIRD GEAR STAGE | ENGAGED | | | | ENGAGED |
| FOURTH GEAR STAGE | ENGAGED | ENGAGED | | | |
| FIFTH GEAR STAGE | | ENGAGED | | | ENGAGED |
| SIXTH GEAR STAGE | | ENGAGED | | ENGAGED | |
| REVERSE GEAR STAGE | | | ENGAGED | | ENGAGED |

HYDRAULIC CONTROL DEVICE OF AUTOMATIC TRANSMISSION

TECHNICAL FIELD

The present invention relates to a hydraulic control device of an automatic transmission mounted on a vehicle and belongs to a technical field of automatic transmissions for vehicles.

BACKGROUND ART

An automatic transmission is configured to automatically switch shift gear stages, that is, power transmission paths by selective engagement of a plurality of hydraulic friction engaging elements, each of the power transmission paths being constituted by a planetary gear mechanism and the like. Each of the shift gear stages is basically formed by the engagement of two friction engaging elements. However, a first gear stage in a D range (drive range) is conventionally formed by one friction engaging element and a one-way clutch (OWC) for the purpose of, for example, smoothing of a gear shift operation.

However, the OWC is high in cost. In addition, the OWC incurs rotational resistance at gear stages other than the first gear stage in the D range, and this hinders improvement of fuel efficiency of an engine. On this account, discontinuation of the OWC has been proposed or executed in recent years.

For example, PTL 1 discloses an automatic transmission with six forward gear stages and one reverse gear stage, the automatic transmission including as friction engaging elements: a forward clutch (hereinafter referred to as a "low clutch") C1 engaged at the first to fourth gear stages; a high clutch C2 engaged at the fourth to sixth gear stages; a 3 & 5 & reverse brake (hereinafter referred to as an "R35 brake") B1 engaged at the third, fifth, and reverse gear stages; a 2 & 6 brake (hereinafter referred to as a "26 brake") B2 engaged at the second and sixth gear stages; and a low reverse brake (hereinafter referred to as an "LR brake") B3 engaged at the first and the reverse gear stages. Instead of the OWC, the LR brake B3 is engaged at the first gear stage in the D range. The first gear stage is formed by the engagement of the LR brake B3 and the low clutch C1.

A hydraulic control circuit of the automatic transmission includes electronic hydraulic control valves corresponding to the respective friction engaging elements. The electronic hydraulic control valves control supply of the oil pressure to the five friction engaging elements and discharge of the oil pressure from the five friction engaging elements. The hydraulic control circuit controls the operations of the hydraulic control valves to form the shift gear stage corresponding to a driving state.

CITATION LIST

Patent Literature

PTL 1: Japanese Laid-Open Patent Application Publication No. 07-19326

SUMMARY OF INVENTION

Technical Problem

In a case where the hydraulic control valves, such as a linear solenoid valve, control the oil pressure supplied to the friction engaging elements as described above, a failure of the gear shift operation may occur at the time of a malfunction of the hydraulic control valve.

For example, according to the configuration of the friction engaging elements described in PTL 1, when shifting from the third gear stage to the first gear stage in the D range, and in a state where the oil pressure is supplied to the low clutch, the oil pressure in the R35 brake is discharged by the R35 brake hydraulic control valve, and at the same time, the oil pressure is supplied to the LR brake by the LR brake hydraulic control valve. Therefore, if a failure of the R35 brake hydraulic control valve occurs, the LR brake is engaged in a state where the oil pressure is supplied to the R35 brake. Examples of the failure of the R35 brake hydraulic control valve include opening malfunction of the R35 brake hydraulic control valve (i.e., malfunction in which the R35 brake hydraulic control valve is fixed in a state where the oil pressure is supplied to the friction engaging element, and pressure cannot be discharged), and a failure in which pressure discharge from the R35 brake becomes incomplete.

To be specific, three friction engaging elements that are the low clutch, the LR brake, and the R35 brake become an engaged state or an almost engaged state. Here, when input torque is applied to the automatic transmission, the friction elements share and receive the input torque. The torque that each friction engaging element can receive (torque capacity) is determined depending on the supplied oil pressure. When the shared torque is higher than the torque capacity of the friction engaging element, the friction engaging element becomes a sliding state. When the shared torque is lower than the torque capacity of the friction engaging element, the friction engaging element becomes the engaged state. When three friction engaging elements that are the low clutch, the LR brake, and the R35 brake become the engaged state or the almost engaged state as described above, and if low clutch pressure is controlled to be low for, for example, suppressing shock of the shifting, engaging power of the R35 brake may exceed engaging power of the low clutch depending on a relation between the shared torque and the torque capacity in a state where the LR brake is engaged (i.e., the R35 brake may become the engaged state, and the low clutch may become the sliding state). In this case, by the engagement of the R35 brake and the LR brake, the shift gear stage shifts to the reverse gear stage.

An object of the present invention is to, in an automatic transmission configured such that each of shift gear stages is formed by engagement of two friction engaging elements, prevent failure of a gear shift operation, and especially prevent shifting of the shift gear stage from a D range to a reverse gear stage as a result of oil pressure being simultaneously supplied to three friction engaging elements due to failure of hydraulic control valves configured to control the oil pressure supplied to the friction engaging elements.

Solution to Problem

To solve the above problems, a hydraulic control device of an automatic transmission of a vehicle according to the present invention is configured as below.

A first aspect of the present invention is a hydraulic control device of an automatic transmission in which: a forward first shift gear stage is formed by engagement of a first friction engaging element and a second friction engaging element; a second shift gear stage is formed by engagement of the second friction engaging element and a third friction engaging element, the second shift gear stage being at a higher shift gear stage side of the first shift gear stage;

and a reverse gear stage is formed by engagement of the first friction engaging element and the third friction engaging element, the hydraulic control device including: a hydraulic control valve configured to control an oil pressure supplied to the third friction engaging element; and a switching valve configured to be switched between a first state where a source pressure port of the hydraulic control valve is connected to an oil pressure source and a second state where the pressure is discharged from the source pressure port, wherein: the switching valve becomes the first state when the oil pressure supplied to the second friction engaging element is not less than a predetermined oil pressure in a case where the second shift gear stage is shifted to the first shift gear stage since the third friction engaging element is released and the first friction engaging element is engaged in a state where the second friction engaging element is engaged; and the switching valve becomes the second state when the oil pressure supplied to the second friction engaging element is less than the predetermined oil pressure in a case where the second shift gear stage is shifted to the first shift gear stage since the third friction engaging element is released and the first friction engaging element is engaged in a state where the second friction engaging element is engaged.

A second aspect of the present invention is the hydraulic control device according to the first aspect of the present invention, wherein the predetermined oil pressure is an oil pressure by which the second friction engaging element maintains a engaged state in a state where the oil pressure is simultaneously supplied to the first, second, and third friction engaging elements.

A third aspect of the present invention is the hydraulic control device according to the first or second aspect of the present invention, wherein the switching valve becomes the second state since the first friction engaging element becomes an engageable state when the oil pressure supplied to the second friction engaging element is less than the predetermined oil pressure.

A fourth aspect of the present invention is the hydraulic control device according to the third aspect of the present invention and further includes a second switching valve configured to be switched between a state of supplying the oil pressure to the first friction engaging element and a state of discharging the oil pressure from the first friction engaging element, wherein: the second switching valve includes a port configured to become a pressure discharge state when the oil pressure is supplied to the first friction engaging element in a forward movement state; and the switching valve becomes the second state since the first friction engaging element becomes an engageable state because a port communicating with a source pressure port of the hydraulic control valve communicates with the port of the second switching valve when the oil pressure supplied to the second friction engaging element is less than the predetermined oil pressure.

A fifth aspect of the present invention is the hydraulic control device according to any one of the first to fourth aspects of the present invention and further includes a second hydraulic control valve configured to control the oil pressure supplied to the second friction engaging element, wherein: the oil pressure generated by the second hydraulic control valve is introduced as a pilot pressure to the switching valve; the switching valve becomes the first state when the pilot pressure is not less than the predetermined oil pressure; and the switching valve becomes the second state when the pilot pressure is less than the predetermined oil pressure.

Advantageous Effects of Invention

According to the above configurations, the following effects can be obtained by the invention recited in claims of the present application.

According to the first aspect of the present invention, when the oil pressure supplied to the second friction engaging element is less than the predetermined oil pressure in a case where the forward second shift gear stage is shifted to the first shift gear stage since the third friction engaging element is released and the first friction engaging element is engaged in a state where the second friction engaging element is engaged, the switching valve becomes the second state where the pressure is discharged from the source pressure port of the hydraulic control valve configured to control the oil pressure supplied to the third friction engaging element.

Therefore, even if the hydraulic control valve causes failure such as an opening malfunction, the oil pressure supplied to the third friction engaging element is discharged from the third friction engaging element, and the third friction engaging element is surely released. Therefore, even in a case where the oil pressure supplied to the second friction engaging element is less than the predetermined oil pressure, and the engaging power of the second friction engaging element is relatively low, it is possible to prevent a case where the first friction engaging element becomes the engaged state, the second friction engaging element becomes the sliding state, and the third friction engaging element becomes the engaged state. To be specific, since the first friction engaging element, the second friction engaging element, and the third friction engaging element become the engaged state, the engaged state, and a "released state," respectively, the shift gear stage does not become the reverse gear stage.

In contrast, when the oil pressure supplied to the second friction engaging element is not less than the predetermined oil pressure, the switching valve becomes the first state where the source pressure port of the hydraulic control valve is connected to the oil pressure source. Therefore, when the hydraulic control valve causes the failure such as the opening malfunction, the oil pressure in the third friction engaging element is not completely discharged. In this case, since the oil pressure supplied to the second friction engaging element is not less than the predetermined oil pressure, the first friction engaging element, the second friction engaging element, and the third friction engaging element become the engaged state, the engaged state, and the "sliding state," respectively. Therefore, in this case, the shift gear stage of the automatic transmission does not become the reverse gear stage.

According to the second aspect of the present invention, the predetermined oil pressure is set to oil pressure by which the second friction engaging element maintains the engaged state in a state where the oil pressure is simultaneously supplied to the first, second, and third friction engaging elements. To be specific, the predetermined oil pressure is set depending on a relation between the shared torque and torque capacity of each friction engaging element such that: when the oil pressure supplied to the second friction engaging element is not less than the predetermined oil pressure, the first friction engaging element, the second friction engaging element, and the third friction engaging element become the engaged state, the engaged state, and the sliding state, respectively; and when the oil pressure supplied to the second friction engaging element is less than the predetermined oil pressure, the first friction engaging element, the second friction engaging element, and the third friction engaging element become the engaged state, the engaged state, and the released state, respectively. In other words, in a case where the opening malfunction of the hydraulic control valve occurs, the source pressure is directly supplied to the third friction engaging element without being reduced by the hydraulic control valve. The predetermined oil pressure is set such that the second friction engaging element can maintain the engaged state even in this case. Therefore, the shift gear stage of the automatic transmission is surely prevented from becoming the reverse gear stage.

According to the third aspect of the present invention, the switching valve becomes the second state since the first friction engaging element becomes the engageable state when the oil pressure supplied to the second friction engaging element is less than the predetermined oil pressure. At this time, the third friction engaging element is surely released. Therefore, the engagement of the first friction engaging element and the releasing of the third friction engaging element are timely performed in parallel. Thus, the shifting from the second shift gear stage to the first shift gear stage is performed surely and smoothly, the second friction engaging element and the third friction engaging element being engaged at the second shift gear stage, the second friction engaging element and the first friction engaging element being engaged at the first shift gear stage.

According to the fourth aspect of the present invention, an operation in which the switching valve becomes the second state since the first friction engaging element becomes the engageable state is concretely realized by the second switching valve.

According to the fifth aspect of the present invention, the hydraulic control device includes the second hydraulic control valve configured to control the oil pressure supplied to the second friction engaging element. The oil pressure generated by the second hydraulic control valve is introduced as the pilot pressure to the switching valve. The switching valve becomes the second state when the pilot pressure is less than the predetermined oil pressure. Therefore, when the oil pressure supplied to the second friction engaging element is less than the predetermined oil pressure, the switching valve can be switched to the second state without separately generating the pilot pressure for operating the switching valve.

DESCRIPTION OF EMBODIMENTS

Hereinafter, an embodiment of the present invention will be explained.

Figure 1:
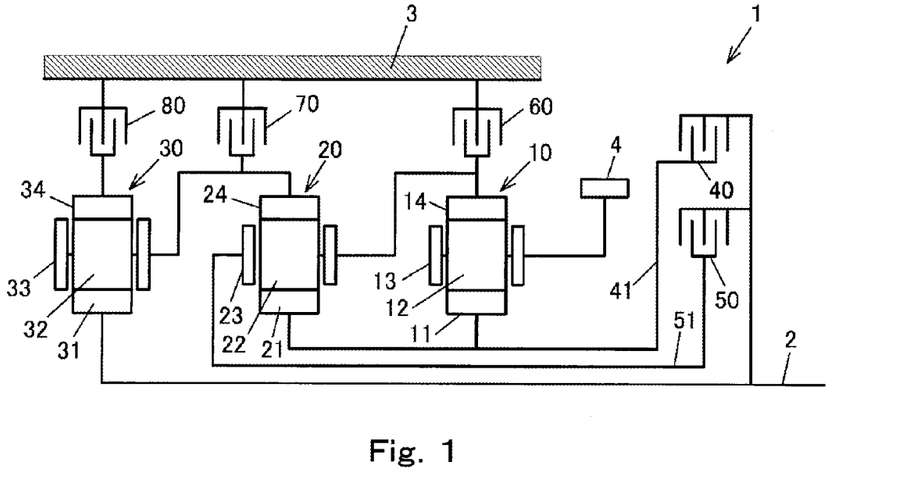
FIG. 1 is a schematic diagram showing major components of an automatic transmission according to an embodiment of the present invention.

FIG. 1 is a schematic diagram showing the configuration of an automatic transmission according to an embodiment of the present invention. An automatic transmission 1 includes an input shaft 2. An engine output is input to the input shaft 2 through a torque converter (not shown). First, second, and third planetary gear sets (hereinafter referred to as "first, second, and third gear sets") 10, 20, and 30 are arranged on the input shaft 2 in this order from an engine side (a right side in FIG. 1). As hydraulic friction engaging elements for switching power transmission paths constituted by the gear sets 10 to 30, the automatic transmission 1 includes a low clutch 40, a high clutch 50, an LR brake 60, a 26 brake 70, and an R35 brake 80. Each of the low clutch 40 and the high clutch 50 selectively transmits power from the input shaft 2 to the gear set 10, 20, or 30. The LR brake 60, the 26 brake 70, and the R35 brake 80 fix predetermined rotational elements of the gear sets 10, 20, and 30.

Each of the gear sets 10, 20, and 30 is constituted by: a sun gear (11, 21, 31); a plurality of pinions (12, 22, 32) which mesh with the sun gear (11, 21, 31); a carrier (13, 23, 33) which supports the pinions (12, 22, 32); and a ring gear (14, 24, 34) which meshes with the pinions (12, 22, 32).

The sun gear 11 of the first gear set 10 and the sun gear 21 of the second gear set 20 are connected to each other to be coupled to an output member 41 of the low clutch 40. The carrier 23 of the second gear set 20 is coupled to an output member 51 of the high clutch 50. The input shaft 2 is directly coupled to the sun gear 31 of the third gear set 30.

The ring gear 14 of the first gear set 10 and the carrier 23 of the second gear set 20 are connected to each other, and the LR brake 60 is provided between a transmission case 3 and a group of the ring gear 14 and the carrier 23. The ring gear 24 of the second gear set 20 and the carrier 33 of the third gear set 30 are connected to each other, and the 26 brake 70 is provided between the transmission case 3 and a group of the ring gear 24 and the carrier 33. Further, the R35 brake 80 is provided between the transmission case 3 and the ring gear 34 of the third gear set 30. An output gear 4 is coupled to the carrier 13 of the first gear set 10. The output gear 4 supplies an output of the automatic transmission 1 to a driving wheel (not shown).

Figure 2:
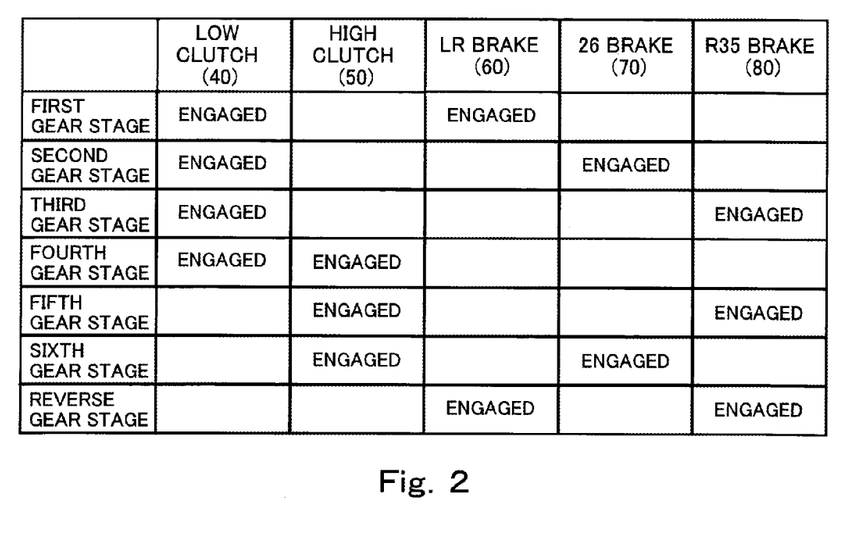
FIG. 2 is a table showing a relationship among combinations of engagement of friction engaging elements and shift gear stages.

With this configuration, as shown in FIG. 2, the automatic transmission 1 forms first to sixth gear stages in a D range and a reverse gear stage in an R range (reverse range) by combinations of engagement of the low clutch 40, the high clutch 50, the LR brake 60, the 26 brake 70, and the R35 brake 80.

The low clutch 40, the LR brake 60, and the R35 brake correspond to the second friction engaging element, the first friction engaging element, and the third friction engaging element in "Solution to Problem," respectively. The first gear stage and the third gear stage in the present embodiment correspond to the first shift gear stage and the second shift gear stage in "Solution to Problem," respectively.

The automatic transmission 1 includes a hydraulic control circuit. The hydraulic control circuit selectively supplies the oil pressure to the friction engaging elements 40 to 80 to form the shift gear stages. Next, the configuration of a hydraulic control circuit 100 will be explained in reference to FIG. 3, and especially the configurations of portions which relate to control when shifting from the third gear stage to the first gear stage in the D range will be explained in reference to FIG. 3.

Figure 3:
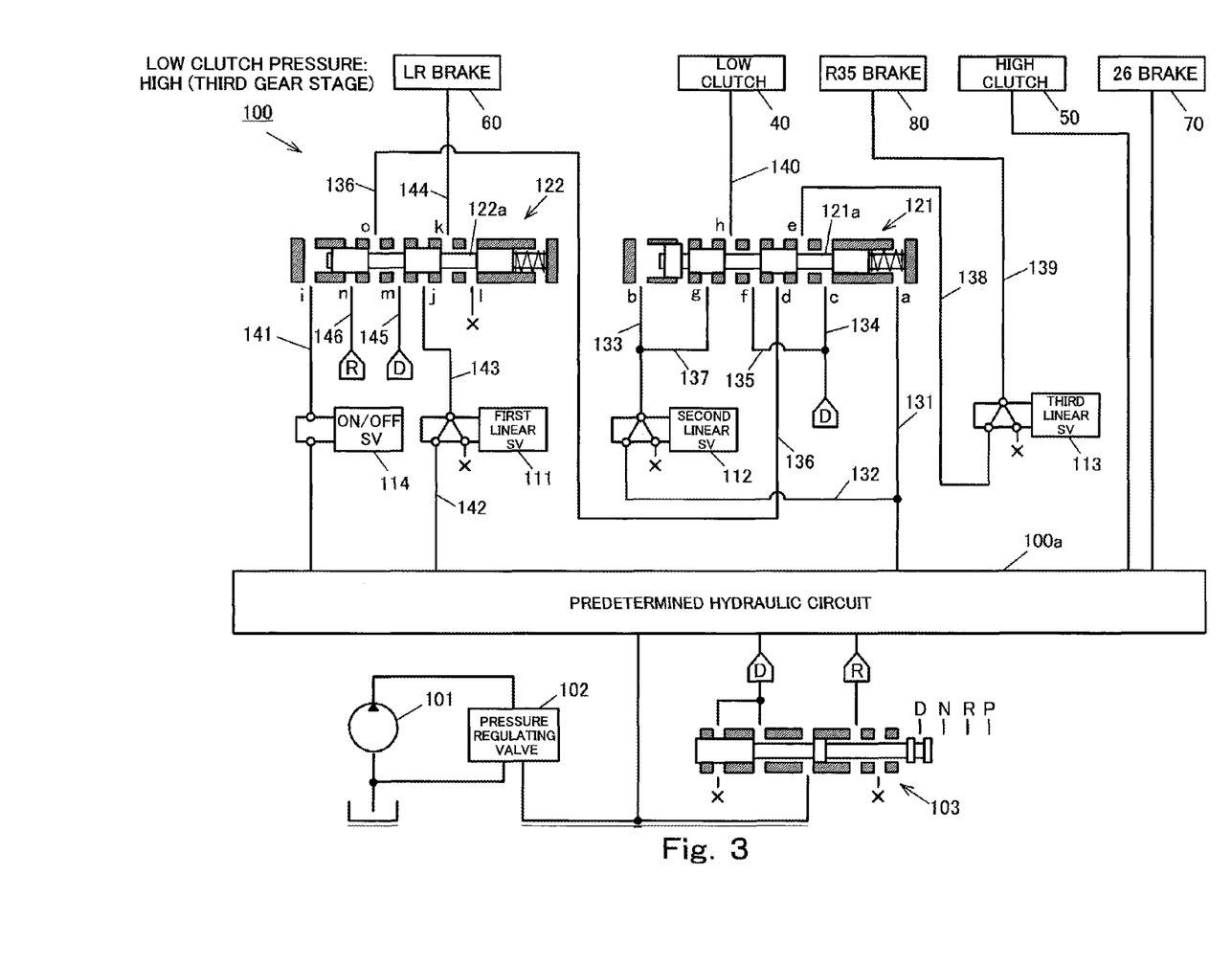
FIG. 3 is a circuit diagram showing configurations of major components of a hydraulic control circuit.

As shown in FIG. 3, the hydraulic control circuit 100 includes a pressure regulating valve 102 and a manual valve 103. The pressure regulating valve 102 adjusts a discharge pressure of an oil pump 101 into a line pressure that is a predetermined oil pressure. The manual valve 103 switches destinations to which the line pressure is supplied, in accordance with the range selected by a driver. The line pressure output from the manual valve 103 when the D range is selected (hereinafter referred to as "D range pressure"), the line pressure output from the manual valve 103 when the R range is selected (hereinafter referred to as "R range pressure"), and the line pressure which does not pass through the manual valve 103 is output toward the friction engaging elements 40 to 80 through a predetermined hydraulic circuit 100a including various valves.

The hydraulic control circuit 100 includes a first linear solenoid valve (hereinafter referred to as a "first linear SV") 111, a second linear solenoid valve (hereinafter referred to as a "second linear SV") 112, and a third linear solenoid valve (hereinafter referred to as a "third linear SV") 113. The first linear SV 111 controls the oil pressure supplied to the LR brake 60. The second linear SV 112 controls the oil pressure supplied to the low clutch 40. The third linear SV 113 controls the oil pressure supplied to the R35 brake 80. Further, the hydraulic control circuit 100 includes an R35 cut valve (hereinafter referred to as a "cut valve") 121, an LR shift valve (hereinafter referred to as a "shift valve") 122, and an on/off solenoid valve (hereinafter referred to as an "on/off SV") 114. The cut valve 121 switches supply states of the oil pressure supplied to the low clutch 40 and the R35 brake 80. The shift valve 122 switches a supply state of the oil pressure supplied to the LR brake 60. The on/off SV 114 controls operations of the shift valve 122.

The third linear SV 113 and the second linear SV 112 correspond to the "hydraulic control valve" and the "second hydraulic control valve" in "Solution to Problem," respectively. The cut valve 121 and the shift valve 122 correspond to the "switching valve" and the "second switching valve" in "Solution to Problem," respectively.

The first to third linear SVs 111 to 113 and the on/off SV 114 operate by control signals from a below-described control device 200. Each of the first to third linear SVs 111 to 113 outputs control pressure to a downstream-side oil passage or closes an upstream-side oil passage to discharge pressure in the downstream-side oil passage. The control pressure is generated from source pressure, such as the line pressure, the D range pressure, and the R range pressure, supplied through the upstream-side oil passage. The on/off SV 114 opens and closes upstream and downstream sides of the oil passage. When the on/off SV 114 closes the oil passage, the on/off SV 114 discharges the pressure in the downstream-side oil passage.

The cut valve 121 includes a first control port a and a second control port b. The first control port a is provided at an end portion to which a return spring of a spool 121a is attached. The second control port b is provided at an opposite end portion having a larger pressure receiving area. The line pressure as a first pilot pressure is introduced through an oil passage 131 into the first control port a. The control pressure as a second pilot pressure is introduced through an oil passage 133 into the second control port b, the control pressure being generated by the second linear SV 112 from the source pressure that is the line pressure supplied through the oil passage 132.

When the second pilot pressure is not less than predetermined oil pressure, the second pilot pressure overcomes the first pilot pressure (line pressure) and a biasing force of the return spring, so that the spool 121a is located at a stroke position at the first control port a side as shown in FIG. 3 (this corresponds to a "first state" in "Solution to Problem"). In contrast, when the second pilot pressure is less than the predetermined oil pressure, the spool 121a is located at a set position at the second control port b side by the first pilot pressure and the biasing force of the return spring (this corresponds to a "second state" in "Solution to Problem").

The predetermined oil pressure is an oil pressure which is higher by a predetermined pressure than lowest oil pressure (engagement limit oil pressure) by which the low clutch 40 does not slip even when the oil pressure is simultaneously supplied to the low clutch 40, the LR brake 60, and the R35 brake 80, and the oil pressure supplied to the R35 brake 80 is the line pressure. To be specific, even if the oil pressure is simultaneously supplied to the friction engaging elements 40, 60, and 80 due to some problem, and the line pressure is supplied to the R35 brake 80, the low clutch 40 does not slip as long as the predetermined oil pressure is supplied to the low clutch 40, and therefore, a state where the LR brake 60 and the R35 brake 80 are practically engaged does not occur.

The cut valve 121 includes R35 brake first and second input ports c and d and an R35 brake output port e and low clutch first and second input ports f and g and a low clutch output port h. As shown in FIG. 3, when the spool 121a is located at the stroke position, the R35 brake first input port c and the low clutch first input port f communicate with the output ports e and h, respectively. In contrast, when the spool 121a moves to the set position, the R35 brake second input port d and the low clutch second input port g communicate with the output ports e and h, respectively (see FIG. 7).

Oil passages 134 and 135 through which the D range pressure is supplied are connected to the R35 brake first input port c and the low clutch first input port f, respectively. An oil passage 136 extending from the shift valve 122 is connected to the R35 brake second input port d. An oil passage 137 through which control pressure is supplied is connected to the low clutch second input port g, the control pressure being equal to the second pilot pressure generated by the second linear SV 112.

Further, an oil passage 138 extending from a source pressure port of the third linear SV 113 is connected to the R35 brake output port e. An output port of the third linear SV 113 is connected to the R35 brake 80 through an oil passage 139. The low clutch output port h is connected to the low clutch 40 through an oil passage 140.

The shift valve 122 includes a control port i. The control port i is provided at an end portion opposite to an end portion to which a return spring of a spool 122a is attached. When the on/off SV 114 opens an oil passage 141, the line pressure is introduced as the pilot pressure to the control port i. With this, the spool 122a is located at the stroke position shown in FIG. 3 against the biasing force of the return spring. In contrast, when the on/off SV 114 closes the oil passage 141, the pressure is discharged through the control port i, and the spool 122*a* is located at the set position at the control port i side by the biasing force of the return spring.

The shift valve 122 includes an LR brake input port j, an LR brake output port k, an LR brake drain port 1, an R35 brake first input port m, an R35 brake second input port n, and an R35 brake output port o. When the spool 122*a* is located at the stroke position shown in FIG. 3, the LR brake output port k communicates with the LR brake drain port 1, and the R35 brake first input port m communicates with the R35 brake output port o. In contrast, when the spool 122*a* is located at the set position, the LR brake input port j communicates with the LR brake output port k, and the R35 brake second input port n communicates with the R35 brake output port o (see FIG. 5).

An oil passage 143 through which control pressure is supplied is connected to the LR brake input port j, the control pressure being generated by the first linear SV 111 from the source pressure that is the line pressure supplied through an oil passage 142. An oil passage 144 extending from the LR brake 60 is connected to the LR brake output port k.

An oil passage 145 through which the D range pressure is supplied is connected to the R35 brake first input port m, and an oil passage 146 through which the R range pressure is supplied is connected to the R35 brake second input port n. The oil passage 136 extending from the R35 brake second input port d of the cut valve 121 is connected to the R35 brake output port o.

Figure 4:
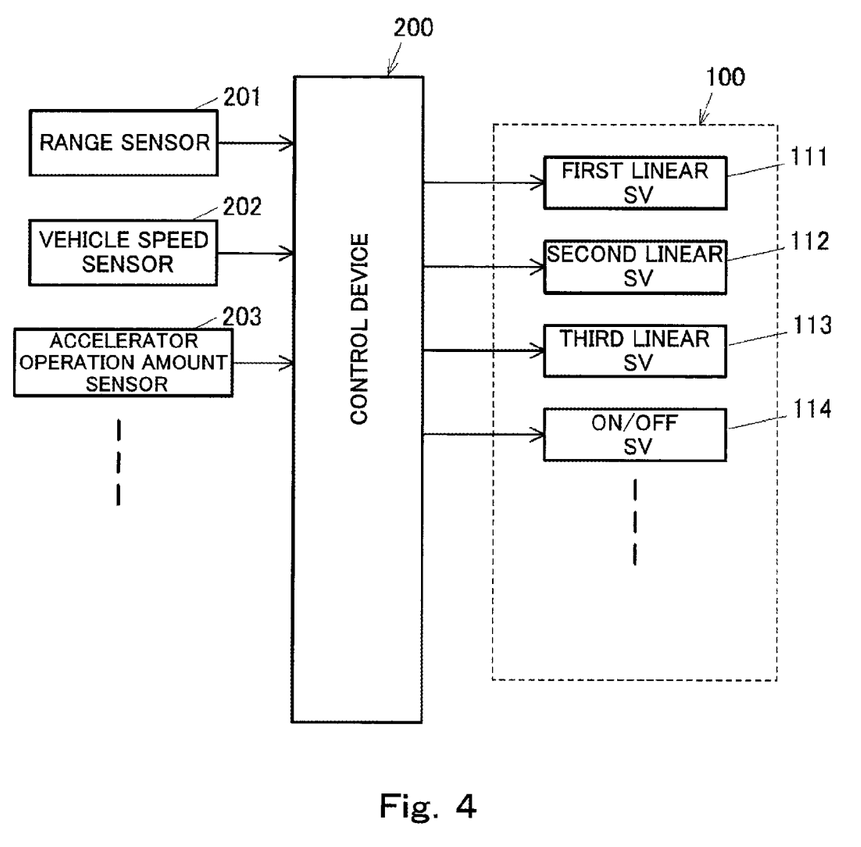
FIG. 4 is a block diagram showing major components of a control system of the hydraulic control circuit.

In addition to the above configuration, the automatic transmission 1 includes a control device 200 configured to control the solenoid valves of the hydraulic control circuit 100 to form the shift gear stage corresponding to a driving state. As shown in FIG. 4, the control device 200 receives a signal from a range sensor 201 configured to detect the range selected by the operation of the driver, a signal from a vehicle speed sensor 202 configured to detect the speed of a vehicle, a signal from an accelerator operation amount sensor 203 configured to detect an operation amount of an accelerator pedal operated by the driver, and the like.

In accordance with the driving state indicated by these signals, the control device 200 outputs the control signals to the first to third linear SVs 111 to 113, the on/off SV 114, and the other solenoid valves of the hydraulic control circuit 100. Thus, the oil pressure is selectively supplied to the predetermined friction engaging elements, so that the shift gear stage corresponding to the driving state is formed.

Next, specific operations of the oil pressure control when shifting from the third gear stage to the first gear stage in the D range by the operations of the solenoid valves will be explained based on the hydraulic circuit diagrams and time charts of FIGS. 3 and 5 to 9. The oil passage through which the oil pressure is supplied to the low clutch 40 changes depending on whether or not the oil pressure is not less than the predetermined oil pressure. If the oil pressure (required oil pressure) supplied to the low clutch 40 is low, selection shock generated when shifting the gear stage can be suppressed. Hereinafter, a case where the oil pressure supplied to the low clutch 40 is not less than the predetermined oil pressure and a case where the oil pressure supplied to the low clutch 40 is less than the predetermined oil pressure will be explained in order.

Case where Oil Pressure Supplied to Low Clutch is not Less than Predetermined Oil Pressure First, the following will explain a case where the required oil pressure of the low clutch 40 (i.e., the oil pressure supplied to the low clutch 40) is not less than the predetermined oil pressure at the third gear stage in the D range. In this case, as shown in FIG. 3, the second linear SV 112 adjusts the source pressure into the control pressure that is not less than the predetermined oil pressure, and introduces the control pressure as the second pilot pressure to the second control port b of the cut valve 121. With this, the spool 121*a* of the cut valve 121 is located at the stroke position (see FIG. 6, reference signs (i) and (ii)).

Therefore, the D range pressure supplied through the oil passage 135 is supplied to the low clutch 40 through the oil passage 140. To be specific, although the second linear SV 112 controls the control pressure such that the control pressure becomes not less than the predetermined oil pressure, this control pressure is utilized as the pilot pressure and is not supplied to the low clutch 40. The D range pressure that is higher than the predetermined oil pressure is supplied to the low clutch 40. The D range pressure supplied through the oil passage 134 is supplied to the third linear SV 113 through the oil passage 138. The third linear SV 113 generates the control pressure from the source pressure that is the D range pressure, and supplies the generated control pressure to the R35 brake 80 through the oil passage 139. Therefore, the low clutch 40 and the R35 brake 80 are engaged to form the third gear stage.

At the third gear stage in the D range, by opening the upstream and downstream sides of the oil passage 141 with the on/off SV 114, the line pressure is introduced as the pilot pressure to the control port i of the shift valve 122, and the spool 122*a* of the valve 122 is located at the stroke position. At this time, the oil passages 143 and 144 are separated from each other, that is, the first linear SV 111 and the LR brake 60 are separated from each other, and therefore, the LR brake 60 is not engaged at the third gear stage.

The D range pressure supplied through the oil passage 145 is supplied to the cut valve 121 through the shift valve 122 and the oil passage 136. However, since the spool 121*a* of the cut valve 121 is located at the stroke position as described above, the D range pressure is not supplied from the shift valve 122 side to the third linear SV 113 or the R35 brake 80.

Figure 5:
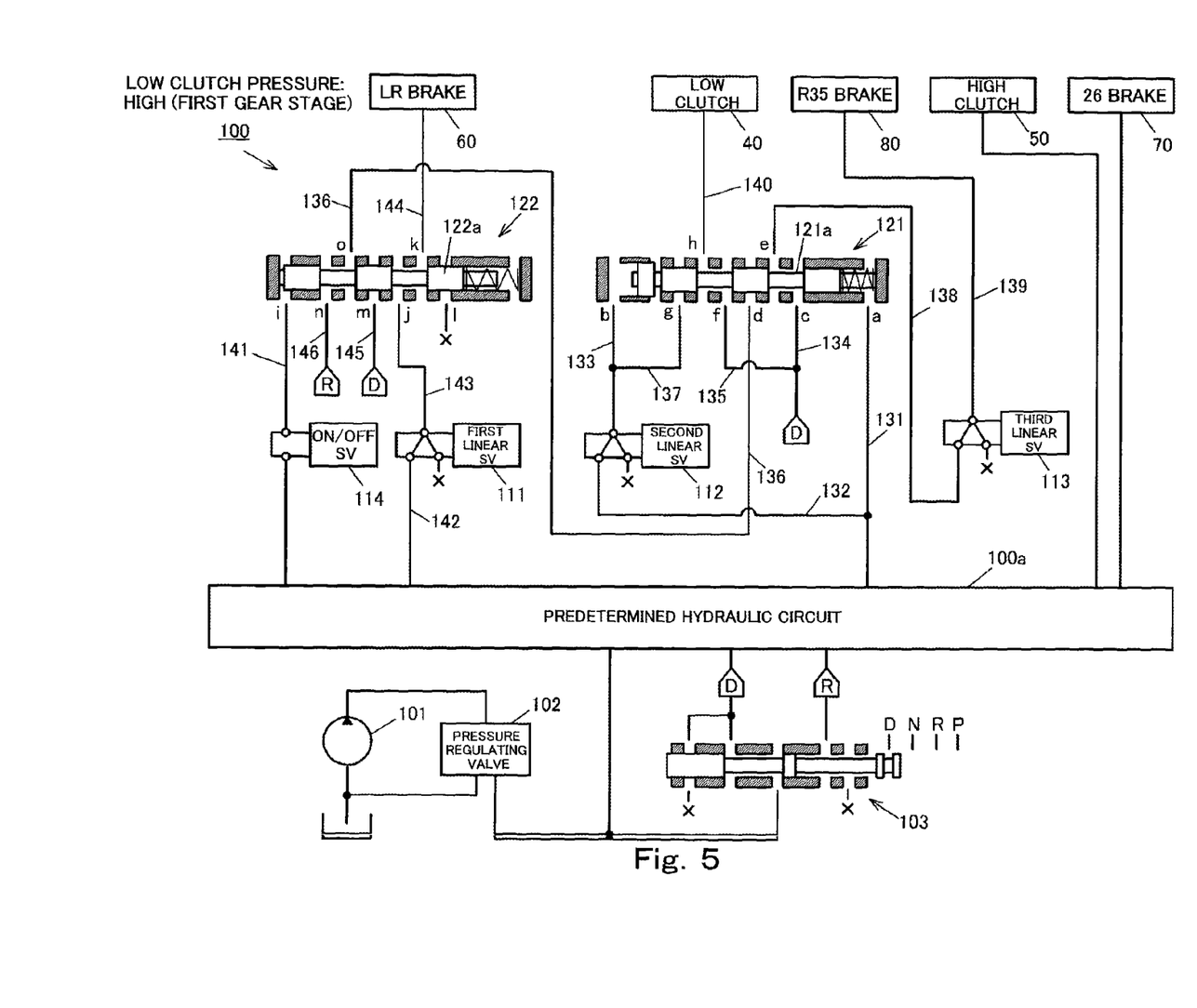
FIG. 5 is a major component circuit diagram showing a state of a first gear stage when oil pressure of a low clutch of the hydraulic control circuit is high.
Figure 6:
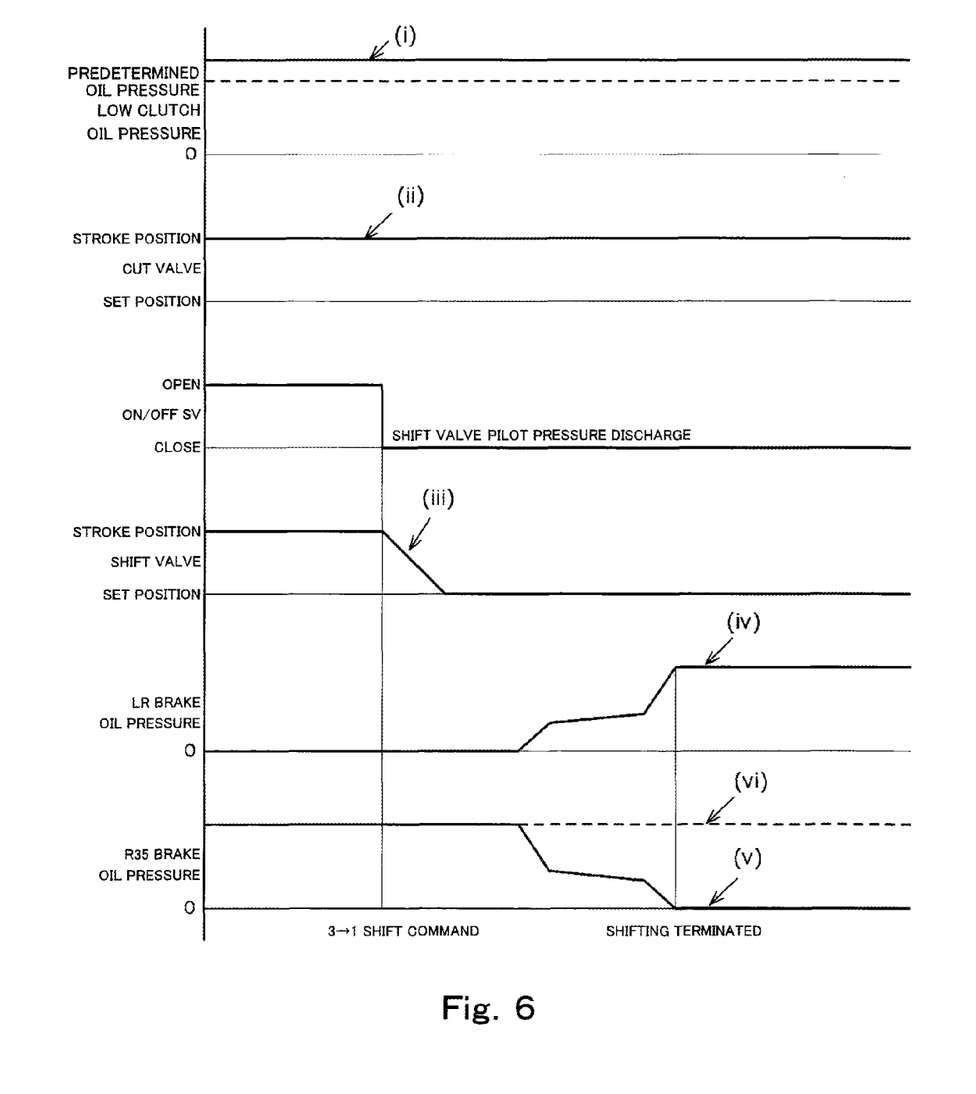
FIG. 6 is a time chart showing state changes of respective portions when shifting from a third gear stage to the first gear stage in a case where the oil pressure supplied to the low clutch is high.

Next, in this state, when the control device 200 outputs a shift command for shifting from the third gear stage to the first gear stage, the on/off SV 114 closes the oil passage 141 and discharges the pilot pressure through the control port i of the shift valve 122. With this, as shown in FIG. 5, the spool 122*a* of the shift valve 122 moves from the stroke position to the set position (see FIG. 6, reference sign (iii)).

At this time, the oil passages 143 and 144 provided downstream of the first linear SV 111 communicate with each other through the shift valve 122, and the control pressure adjusted by the first linear SV 111 is supplied to the LR brake 60. Thus, the LR brake 60 is engaged (see FIG. 6, reference sign (iv)).

As with the above case of the third gear stage, the spool 121*a* of the cut valve 121 is located at the stroke position, and the D range pressure is supplied to the third linear SV 113 through the oil passages 134 and 138. However, since the third linear SV 113 discharges the oil pressure in the R35 brake 80 according to the signal from the control device 200, the R35 brake 80 is released (see FIG. 6, reference sign (v)). Therefore, the shift gear stage becomes the first gear stage by the engagement of the low clutch 40 and the LR brake 60.

When shifting from the third gear stage to the first gear stage, even if the oil pressure in the R35 brake 80 is not adequately discharged due to a failure such as an opening malfunction of the third linear SV 113, and therefore, the R35 brake 80 is not completely released, the oil pressure supplied to the low clutch 40 is the D range pressure and is higher than the above-described engagement limit oil pressure. Therefore, as shown by reference sign (vi) in FIG. 6, even if the supply of the line pressure to the R35 brake 80 continues, the low clutch 40 maintains a engaged state, and the shift gear stage does not become the reverse gear stage.

At this time, depending on a magnitude correlation between an engaging power of the LR brake 60 and an engaging power of the R35 brake 80, the shift gear stage may not become the first gear stage and may be maintained at the third gear stage.

Figure 7:
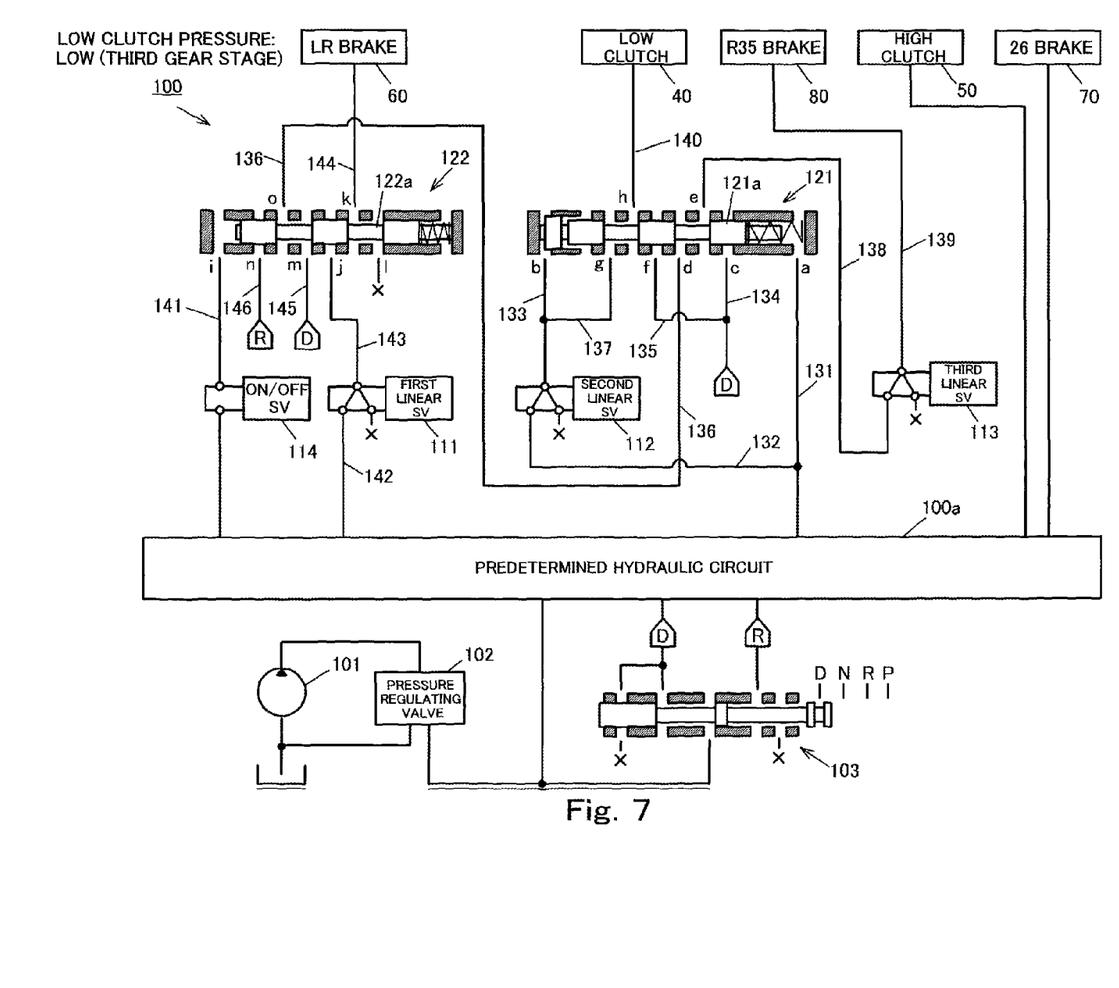
FIG. 7 is a major component circuit diagram showing a state of the third gear stage when the oil pressure supplied to the low clutch of the hydraulic control circuit is low.

Case where Oil Pressure Supplied to Low Clutch is Less than Predetermined Oil Pressure Next, the following will explain a case where the required oil pressure of the low clutch 40 (i.e., the oil pressure supplied to the low clutch 40) is less than the predetermined oil pressure. In this case, the second linear SV 112 adjusts the source pressure into the control pressure that is the required oil pressure. With this, the second pilot pressure supplied to the second control port b of the cut valve 121 also becomes less than the predetermined oil pressure. Therefore, as shown in FIG. 7, the spool 121a of the cut valve 121 moves to the set position by the first pilot pressure supplied to the first control port a and the biasing force of the return spring (see FIG. 9, reference signs (vi) and (vii)).

At this time, the introduction of the D range pressure from the oil passage 135 to the low clutch 40 is blocked, and the control pressure that is adjusted by the second linear SV 112 to be less than the predetermined oil pressure is supplied to the low clutch 40 through the oil passage 137, the cut valve 121, and the oil passage 140. With this, the low clutch 40 is engaged by the control pressure that is adjusted by the second linear SV 112 to be the required oil pressure. To be specific, when the control pressure adjusted by the second linear SV 112 is not less than the predetermined oil pressure, the D range pressure is supplied to the low clutch 40 (see FIG. 3). In contrast, when the control pressure is less than the predetermined oil pressure, the control pressure is supplied to the low clutch 40.

Since the spool 121a of the cut valve 121 is located at the set position, the introduction of the D range pressure through the oil passage 134 to the R35 brake 80 is blocked, and the D range pressure supplied from the shift valve 122 through the oil passage 136 is supplied as the source pressure to the third linear SV 113 through the cut valve 121 and the oil passage 138. The control pressure generated by adjusting the source pressure by the third linear SV 113 is supplied to the R35 brake 80 through the oil passage 139.

Therefore, even in this case, the low clutch 40 and the R35 brake 80 are engaged to form the third gear stage as with the case shown in FIG. 3. It should be noted that in the case shown in FIG. 7, the oil pressure supplied to the low clutch 40 is not the D range pressure unlike the case shown in FIG. 3 but is the oil pressure that is reduced by the second linear SV 112 to be less than the predetermined oil pressure.

Figure 8:
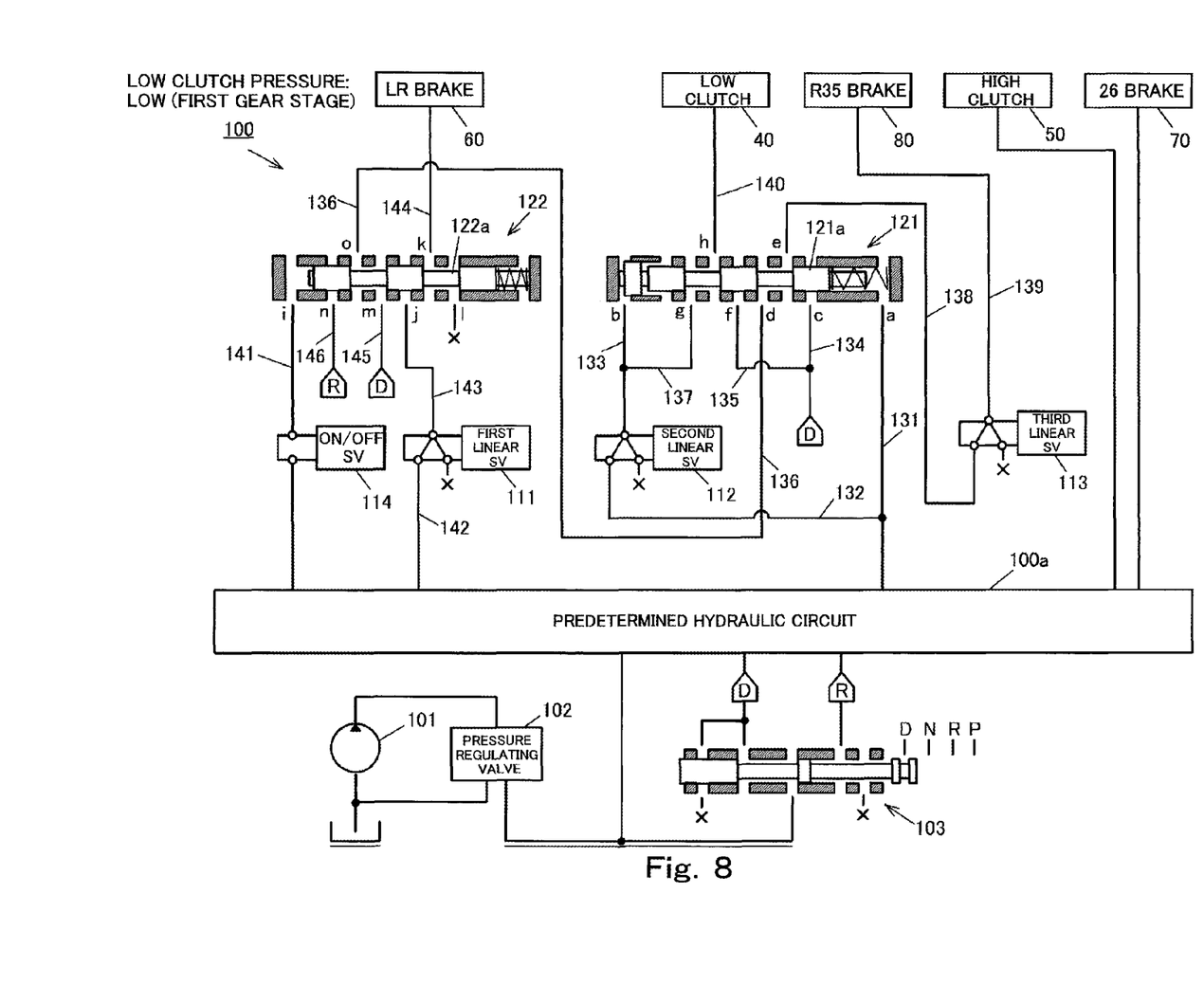
FIG. 8 is a major component circuit diagram showing a state of the first gear stage when the oil pressure supplied to the low clutch of the hydraulic control circuit is low.
Figure 9:
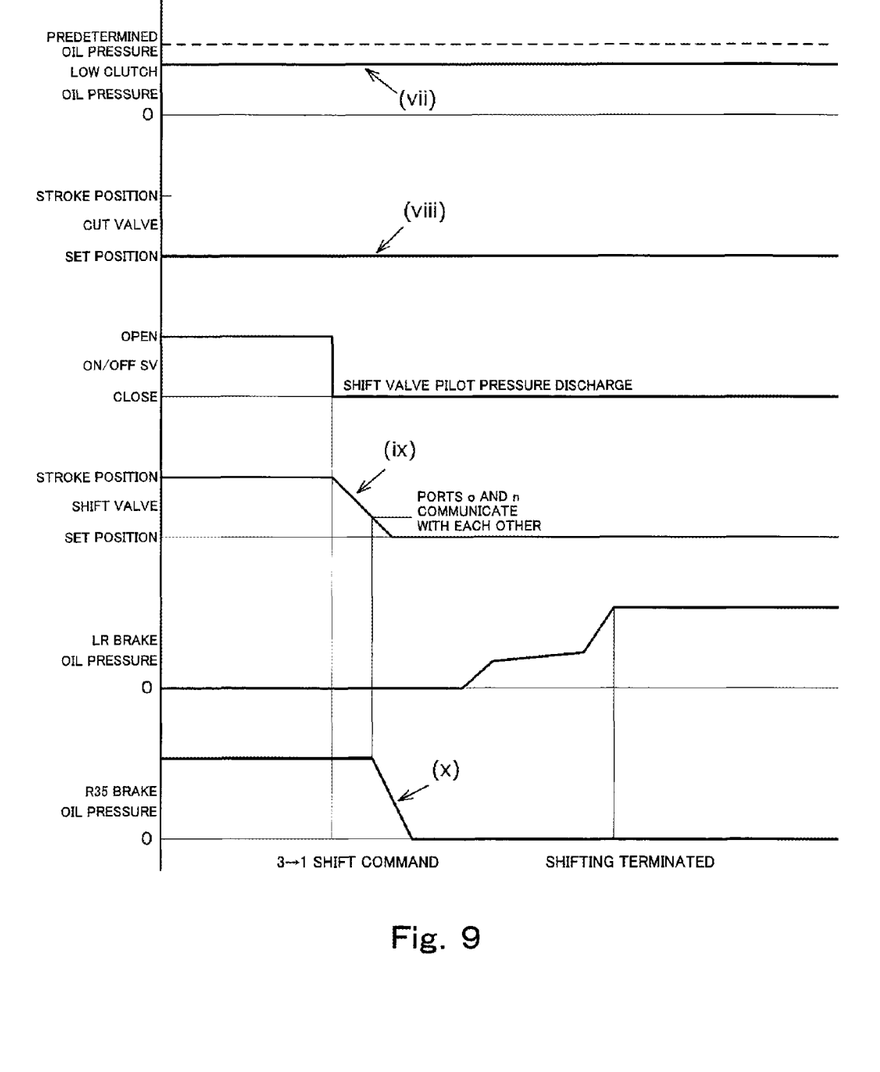
FIG. 9 is a time chart showing state changes of respective portions when shifting from the third gear stage to the first gear stage in a case where the oil pressure supplied to the low clutch is low.

In this state, when the control device 200 outputs the shift command for shifting from the third gear stage to the first gear stage, as shown in FIG. 8, the on/off SV 114 closes the oil passage 141 and discharges the pilot pressure through the control port i of the shift valve 122 as with a case where the required oil pressure of the low clutch 40 is not less than the predetermined oil pressure. Therefore, the spool 122a of the shift valve 122 moves to the set position. With this, the control pressure adjusted by the first linear SV 111 is supplied to the LR brake 60 through the oil passage 143, the shift valve 122, and the oil passage 144, and therefore, the LR brake 60 is engaged.

When shifting from the third gear stage to the first gear stage, the R35 brake 80 is released. However, if failure occurs, such as if the opening malfunction of the third linear SV 113 occurs or if the oil pressure in the R35 brake 80 is not completely discharged, the LR brake 60 is engaged in a state where the low clutch 40 is engaged, but the R35 brake 80 is not completely released.

At this time, in a case where the required oil pressure of the low clutch 40 is low, and the control pressure adjusted by the second linear SV 112 is less than the predetermined oil pressure, the engaging power of the low clutch 40 may become smaller than the engaging power of the R35 brake 80, and therefore, the shift gear stage may become the reverse gear stage formed by the engagement of the R35 brake 80 and the LR brake 60.

However, the hydraulic control circuit 100 has a failsafe function with respect to such a case. Even when the required oil pressure of the low clutch 40 is low, the shift gear stage does not become the reverse gear stage.

To be specific, as described above, when the control pressure generated by the second linear SV 112 is less than the predetermined oil pressure, the spool 121a of the cut valve 121 is located at the set position. Further, at the first gear stage, the spool 122a of the shift valve 122 also moves to the set position (see FIG. 9, reference sign (vii)). Therefore, the hydraulic control circuit 100 becomes a state shown in FIG. 8.

At this time, the R35 brake second input port d and R35 brake output port e of the cut valve 121 communicate with each other, so that the oil passage 138 extending between the cut valve 121 and the source pressure port of the third linear SV 113 is connected to the oil passage 136 extending between the cut valve 121 and the shift valve 122.

When shifting from the third gear stage to the first gear stage, the R35 brake second input port n and R35 brake output port o of the shift valve 122 communicate with each other in the middle of the movement of the spool 122a of the shift valve 122 toward the set position. At this time, the oil passage 136 extending between the shift valve 122 and the cut valve 121 is connected to the oil passage 146 through which the R range pressure is supplied.

The oil passage 146 communicates with an R range port p of the manual valve 103, the R range port p becoming a drain state in the D range. Therefore, the source pressure port of the third linear SV 113 communicates with a drain port (R range port) p of the manual valve 103 through the oil passage 138, the cut valve 121, the oil passage 136, the shift valve 122, and the oil passage 146. Therefore, even if the failure of the third linear SV 113 occurs, the oil pressure in the R35 brake 80 is discharged by the movement of the spool 122a toward the set position (see FIG. 9, reference sign (ix)). A discharge oil passage route of the oil pressure is a route shown by arrows in FIG. 8.

This avoids a problem in which when the third gear stage is shifted to the first gear stage, and the oil pressure supplied to the low clutch 40 is less than the predetermined oil pressure, especially not more than the above-described engagement limit oil pressure, the oil pressure in the R35 brake 80 is not completely discharged, the engaging power of the R35 brake exceeds the engaging power of the low clutch 40, the low clutch 40 slips, and the shift gear stage becomes the reverse gear stage.

In the above embodiment, at the first gear stage in the D range, the source pressure of the third linear SV 113 is discharged through the cut valve 121 and the shift valve 122. However, the configurations of the valves 121 and 122 are not limited to these. The valves 121 and 122 may be configured such that when the oil pressure supplied to the low clutch 40 is less than the predetermined oil pressure, the source pressure of the third linear SV 113 is discharged interlockingly with the engagement of the LR brake 60.

The configuration of a power transmission mechanism of the automatic transmission to which the present invention is applied is not limited to the configuration schematically shown in FIG. 1. For example, each of an automatic transmission disclosed in Japanese Laid-Open Patent Application Publication No. 2009-14142 and an automatic transmission disclosed Japanese Laid-Open Patent Application Publication No. 2010-209934, each of which schematically discloses a power transmission mechanism, includes: a friction engaging element engaged at the first to fourth gear stages and corresponding to the low clutch 40; a friction engaging element engaged at the fourth to sixth gear stages and corresponding to the high clutch 50; a friction engaging element engaged at the first gear stage and the reverse gear stage and corresponding to the LR brake 60; a friction engaging element engaged at the second gear stage and the sixth gear stage and corresponding to the 26 brake 70; and a friction engaging element engaged at the third gear stage, the fifth gear stage, and the reverse gear stage and corresponding to the R35 brake 80. The present invention is also applicable to each of these automatic transmissions.

INDUSTRIAL APPLICABILITY

As above, according to the hydraulic control device of the automatic transmission of the present invention, problems which may occur at the time of the failure of the hydraulic control valve due to the discontinuation of the OWC are prevented from occurring. Therefore, the present invention may be suitably utilized in the technical field of manufacture of this type of automatic transmission or the vehicle including the automatic transmission.

REFERENCE CHARACTER LIST 1 automatic transmission
40 second friction engaging element (low clutch)
60 first friction engaging element (LR brake)
80 third friction engaging element (R35 brake)
112 second hydraulic control valve (second linear SV)
113 hydraulic control valve (third linear SV)
121 switching valve (cut valve)
122 second switching valve (shift valve)

The invention claimed is:

1. A hydraulic control device of an automatic transmission in which: a forward first shift gear stage is formed by engagement of a first friction engaging element and a second friction engaging element; a second shift gear stage is formed by engagement of the second friction engaging element and a third friction engaging element, the second shift gear stage being at a higher shift gear stage side of the first shift gear stage; and a reverse gear stage is formed by engagement of the first friction engaging element and the third friction engaging element, the hydraulic control device comprising:
a hydraulic control valve configured to control an oil pressure supplied to the third friction engaging element; and
a switching valve configured to be switched between a first state where a source pressure port of the hydraulic control valve is connected to an oil pressure source and a second state where the pressure is discharged from the source pressure port, wherein:

the switching valve becomes the first state when the oil pressure supplied to the second friction engaging element is not less than predetermined oil pressure in a case where the second shift gear stage is shifted to the first shift gear stage since the third friction engaging element is released and the first friction engaging element is engaged in a state where the second friction engaging element is engaged; and the switching valve becomes the second state when the oil pressure supplied to the second friction engaging element is less than the predetermined oil pressure in a case where the second shift gear stage is shifted to the first shift gear stage since the third friction engaging element is released and the first friction engaging element is engaged in a state where the second friction engaging element is engaged.

2. The hydraulic control device according to claim 1, wherein the predetermined oil pressure is an oil pressure by which the second friction engaging element maintains a engaged state in a state where the oil pressure is simultaneously supplied to the first, second, and third friction engaging elements.

3. The hydraulic control device according to claim 1, wherein the switching valve becomes the second state since the first friction engaging element becomes an engageable state when the oil pressure supplied to the second friction engaging element is less than the predetermined oil pressure.

4. The hydraulic control device according to claim 3, further comprising a second switching valve configured to be switched between a state of supplying the oil pressure to the first friction engaging element and a state of discharging the oil pressure from the first friction engaging element, wherein:

the second switching valve includes a port configured to become a pressure discharge state when the oil pressure is supplied to the first friction engaging element in a forward movement state; and the switching valve becomes the second state since the first friction engaging element becomes an engageable state because a port communicating with a source pressure port of the hydraulic control valve communicates with the port of the second switching valve when the oil pressure supplied to the second friction engaging element is less than the predetermined oil pressure.

5. The hydraulic control device according to claim 1, further comprising a second hydraulic control valve configured to control the oil pressure supplied to the second friction engaging element, wherein:

the oil pressure generated by the second hydraulic control valve is introduced as a pilot pressure to the switching valve;

the switching valve becomes the first state when the pilot pressure is not less than the predetermined oil pressure; and the switching valve becomes the second state when the pilot pressure is less than the predetermined oil pressure.

6. The hydraulic control device according to claim 2, wherein the switching valve becomes the second state since the first friction engaging element becomes an engageable state when the oil pressure supplied to the second friction engaging element is less than the predetermined oil pressure.

7. The hydraulic control device according to claim 6, further comprising a second switching valve configured to be switched between a state of supplying the oil pressure to the first friction engaging element and a state of discharging the oil pressure from the first friction engaging element, wherein:
  the second switching valve includes a port configured to become a pressure discharge state when the oil pressure is supplied to the first friction engaging element in a forward movement state; and
  the switching valve becomes the second state since the first friction engaging element becomes an engageable state because a port communicating with a source pressure port of the hydraulic control valve communicates with the port of the second switching valve when the oil pressure supplied to the second friction engaging element is less than the predetermined oil pressure.

8. The hydraulic control device according to claim 2, further comprising a second hydraulic control valve configured to control the oil pressure supplied to the second friction engaging element, wherein:
  the oil pressure generated by the second hydraulic control valve is introduced as a pilot pressure to the switching valve;
  the switching valve becomes the first state when the pilot pressure is not less than the predetermined oil pressure; and
  the switching valve becomes the second state when the pilot pressure is less than the predetermined oil pressure.

9. The hydraulic control device according to claim 3, further comprising a second hydraulic control valve configured to control the oil pressure supplied to the second friction engaging element, wherein:
  the oil pressure generated by the second hydraulic control valve is introduced as a pilot pressure to the switching valve;
  the switching valve becomes the first state when the pilot pressure is not less than the predetermined oil pressure; and
  the switching valve becomes the second state when the pilot pressure is less than the predetermined oil pressure.

10. The hydraulic control device according to claim 4, further comprising a second hydraulic control valve configured to control the oil pressure supplied to the second friction engaging element, wherein:
  the oil pressure generated by the second hydraulic control valve is introduced as a pilot pressure to the switching valve;
  the switching valve becomes the first state when the pilot pressure is not less than the predetermined oil pressure; and
  the switching valve becomes the second state when the pilot pressure is less than the predetermined oil pressure.

11. The hydraulic control device according to claim 6, further comprising a second hydraulic control valve configured to control the oil pressure supplied to the second friction engaging element, wherein:
  the oil pressure generated by the second hydraulic control valve is introduced as a pilot pressure to the switching valve;
  the switching valve becomes the first state when the pilot pressure is not less than the predetermined oil pressure; and
  the switching valve becomes the second state when the pilot pressure is less than the predetermined oil pressure.

12. The hydraulic control device according to claim 7, further comprising a second hydraulic control valve configured to control the oil pressure supplied to the second friction engaging element, wherein:
  the oil pressure generated by the second hydraulic control valve is introduced as a pilot pressure to the switching valve;
  the switching valve becomes the first state when the pilot pressure is not less than the predetermined oil pressure; and
  the switching valve becomes the second state when the pilot pressure is less than the predetermined oil pressure.

* * * * *